United States Patent [19]

LeGrow

[11] 4,234,713
[45] Nov. 18, 1980

[54] CURABLE SOLVENTLESS ORGANOPOLYSILOXANE COMPOSITIONS

[75] Inventor: Gary E. LeGrow, Midland, Mich.

[73] Assignee: Dow Corning Corporation, Midland, Mich.

[21] Appl. No.: 42,831

[22] Filed: May 29, 1979

Related U.S. Application Data

[63] Continuation-in-part of Ser. No. 912,794, Jun. 5, 1978, abandoned.

[51] Int. Cl.$^3$ ............................................. C08G 77/06
[52] U.S. Cl. ........................................ 528/15; 528/31; 528/32; 528/33; 528/43; 525/478; 260/37 SB
[58] Field of Search ...................... 528/15, 31, 32, 33, 528/43; 525/478

[56] References Cited

U.S. PATENT DOCUMENTS

| | | | |
|---|---|---|---|
| 2,894,930 | 7/1959 | Clark | 260/37 SB |
| 3,944,519 | 3/1976 | Mink et al. | 260/448.2 H |
| 4,163,081 | 7/1979 | Schulz | 528/15 |

*Primary Examiner*—Melvyn I. Marquis
*Attorney, Agent, or Firm*—Robert L. McKellar

[57] ABSTRACT

What is disclosed is platinum catalyzed mixtures of silicon hydride and $CH_2$=CHSi—containing siloxanes which also contain $\{CH_2=CH(CH_3)_2SiO\}_2 Si(C_6H_5)_2$ as a reactive diluent which give curable products having improved handling properties while retaining essential mechanical properties in the cured composition.

7 Claims, No Drawings

CURABLE SOLVENTLESS ORGANOPOLYSILOXANE COMPOSITIONS

BACKGROUND OF THE INVENTION

This application is a continuation-in-part of application Ser. No. 912,794, filed June 5, 1978 and now abandoned.

The present invention relates to curable organopolysiloxane resins containing a reactive diluent.

Organopolysiloxane resins in which the substituent organic groups are methyl, phenyl, vinyl and/or similar organic groups are well-known. These materials cure through a variety of mechanisms, such as peroxide catalyzed vinyl groups on silicon or by the platinum catalyzed addition of silicon hydride to alkenyl groups on silicon. The properties of these organopolysiloxane resins such as toughness and retention of strength at high temperatures make them useful in casting resin applications.

The resins that are useful for casting applications are those that have higher viscosities, on the order of 5.0 to 200 Pa·s or higher. These resins, even though they have the desired strengths, have one important disadvantage. Because of their high viscosities they are extremely difficult to handle in use. They do not pour rapidly and have slow flow when cast into place.

The problem is therefore posed as to how one can use the high viscosity resins for their desirable properties and at the same time obtain desirable handling properties.

An obvious solution is to dilute the resins with solvent but this approach leads to bubble entrapment when the casting resin is heated to cure it. It also leads to the time-consuming step of solvent removal from the cast resin.

Most recent attempts to solve the handling problem have been to incorporate a low molecular weight crosslinker in the system. For example, Clark in U.S. Pat. No. 2,894,930 shows a one-part, curable casting resin wherein he suggests using $(CH_2=CH(CH_3)_2SiO)_2Si(C_6H_5)_2$ as a portion of the reactive alkenyl containing resin. The materials are cured through the use of peroxide catalysts. These materials have the advantage of being one-part, that is, all the essential ingredients can be mixed together and stored without the material curing. The disadvantage, of course, is that fact that the peroxide cured, one-part materials require a long period of time to cure.

Mink et al., in U.S. Pat. No. 3,944,519, overcome the latter problem by increasing the rate of cure of such resins by changing the cure system from the peroxide cured vinyl to the platinum catalysis of the silicon hydride addition to alkenyl groups i.e.

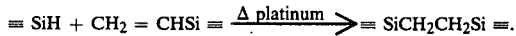

$\equiv SiH + CH_2 = CHSi \equiv \xrightarrow{\Delta\ platinum} \equiv SiCH_2CH_2Si \equiv.$ Thus, Mink et al. utilized low molecular weight (low viscosity) silicon hydride crosslinker organopolysiloxanes in a vinyl containing organopolysiloxane to enhance the cure rate and also to reduce the viscosity of the vinylsiloxane resin so that it could be easily handled. The patent teaches that only specific silicon hydride containing crosslinkers work. The use of low molecular weight vinyl containing diluents is not shown or suggested therein.

It has been found that by adding a specific low molecular weight vinyl containing diluent, lower viscosities of the casting resins can be obtained without sacrificing the desirable mechanical properties of the higher viscosity casting resin.

THE INVENTION

This invention consists of an improved curable composition consisting essentially of a mixture of (a) an organopolysiloxane containing from 67 to 85 mol percent $C_6H_5SiO_{3/2}$ units and 33 to 15 mol percent of $CH_2=CH(CH_3)_2SiO_{\frac{1}{2}}$ units, said organopolysiloxane having an average of at least 8 silicon atoms per molecule; (b) a silicon hydride containing polysiloxane crosslinker for (a), said (b) being present in an amount sufficient to provide about 0.9 to 1.1 mol of silicon hydride per mol of $CH_2=CHSi$ present in (a) and (d); (c) a platinum catalyst in an amount sufficient to catalyze the reaction of the silicon hydride with the $CH_2=CHSi-$; the improvement comprising adding a reactive diluent (d) having the formula $\{CH_2=CH(CH_3)_2SiO\}_2Si(C_6H_5)_2$.

In this invention, the organopolysiloxane resin (a) is the base resin. The critical feature of the resin (a) is that it have a high enough viscosity to give the desired mechanical strength to the cured composition. The resin (a) is essentially the same as that described in Mink et al., discussed above, and consists of monophenylsiloxy units in the range 67 to 85 mol percent; dimethylvinylsiloxy units in the range of 33 to 15 mol percent. Preferred for the resin (a) are 75 mol percent monophenylsiloxy units and 25 mol percent of the dimethylvinylsiloxy units.

This resin is easily prepared by conventional hydrolysis of the corresponding chloro or alkoxysilanes and condensation techniques. Although there does not appear to be any upper limit on the molecular weight of the resin (a), it should have a degree of polymerization of at least 8 silicon atoms per molecule. This is to ensure adequate physical strengths in the final product. The resin (a) can also be treated, for example, by alkaline condensation catalysts, to reduce the silanol content of the resin.

The silicon hydride containing siloxane (b) serves as a crosslinker and curing agent in the curable composition. This material can be any silicon hydride containing silane or siloxane that is compatible and gives the cured composition the desirable properties. This material can be, for example, the polymer found in the Mink et al. patent at column 2, lines 23-25 or $\{H(CH_3)_2SiO\}_2Si(C_6H_5)_2$ or $\{H(CH_3)_2SiO\}_3SiC_6H_5$. The crosslinker must have at least two (2) silicon hydrogens per molecule. There must be enough of (b) present to give from 0.9 to 1.1 mole of silicon hydride per mol of alkenyl groups in the curable composition. Preferred is a ratio of 1 mol of silicon hydride to 1 of alkenyl for the best results. The crosslinkers (b) can be prepared by conventional techniques known to those skilled in the art, for example, the cohydrolysis of the corresponding silanes.

The platinum catalyst (c) can be any of the well-known forms of catalytic platinum, ranging from finely divided platinum metal to platinum on various carriers to the chloroplatinic acid and complexed platinums. Chloroplatinic acid in a small amount of solvent or

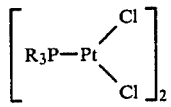

where R is methyl, ethyl, propyl or butyl are preferred.

There should be at least 0.1 parts by weight of platinum per million parts by weight of the combined total of components (a), (b) and (d).

It is preferred to employ 1-20 parts per million.

The fourth and most critical component of this invention is the component (d), the vinyl containing siloxane diluent, $\{CH_2=CH(CH_3)_2SiO\}_2Si(C_6H_5)_2$.

On mixing this diluent with the component (a) in a ratio of 1:4 to 1:1 of component (d) to component (a), a truly solventless material is produced which has a maximum viscosity of about 2.5 Pa·s. The preferred ratio is 25 parts of (d) to 75 parts of (a). This specific material is the only one of many similar materials that was effective in this invention. $\{CH_2=CH(CH_3)_2Si\}_2O$ was too volatile while $\{(C_6H_5)(CH_3)(CH_2=CH)Si\}_2O$ and $\{CH_2=CH(CH_3)_2SiO\}_2SiCH_3(C_6H_5)$, although nonvolatile, reduced the mechanical properties of the cured resin. This material is easily prepared by the same methods as indicated for the component (b) above.

Generally for a two-component system, the component (d) is mixed, with a small portion of the base resin (a) and the catalyst required for cure, into one package. The remainder of the base resin (a) and the crosslinker (b) are mixed together and form a second package. The means and manner for mixing these individual materials is not critical as long as the materials are homogeneous. The two packages can then be mixed together at the appropriate time for their use and cast into place. Upon heating, the composition cures. If other materials are to be mixed with the composition, they should be incorporated in the individual packages during their preparation rather than adding those materials at the final mixing of the whole composition. Other materials that can be incorporated in the resin composition of this invention are the conventional fillers such as glass fibers, finely divided silica, crushed quartz, powdered glass, asbestos, talc, carbon black, iron oxide, titanium oxide, magnesium oxide or mixtures thereof. Also included are pigments, dyes, oxidation inhibitors, cure inhibitors and release agents.

The curable composition can be employed in any conventional manner for casting or impregnating.

The components (a), (b), (c) and (d) are mixed together with any of the above desired additives and mixed to make homogeneous. It is then fabricated into the desired form and cured, usually at elevated temperatures, for example 100°-150° C. It may be desirable in some cases to post cure the cured material at elevated temperatures, for example, up to 200° C.

The following examples are by way of comparison with the systems currently in the prior art. The examples are not intended as limiting the invention delineated in the claims.

EXAMPLE 1

A base resin was prepared consisting of 75 mol percent monophenylsiloxy units and 25 mol percent of vinyldimethylsiloxy units and was designated "A". Various types of crosslinkers designated "B", "C" and "D" were prepared and mixed with A according to conventional techniques in the amounts shown in Table I. The mixture of B with A is the example of the prior art shown in Mink et al., U.S. 3,944,519 at Table II, middle column. B is $\{H(CH_3)_2SiO\}_2Si(C_6H_5)_2$; C is $\{H(CH_3)_2SiO\}_3SiC_6H_5$ and D is 35 mole % diphenylsiloxy units; 55 mole % HCH$_3$SiO units and 10 mole % (CH$_3$)$_3$SiO$_{\frac{1}{2}}$units. The catalyst was 1%

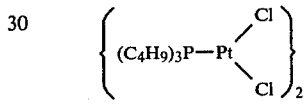

in toluene. Runs 1, 2 and 3 are outside the scope of the invention and are the prior art.

TABLE I

| Run No. | Parts A | Parts B | Parts C | Parts D | ppm cat | Visc. Pa·s @25° C. uncured | Cured flex strength psi | Cured tan modulus psi × 10$^5$ | Cured sec. modulus psi × 10$^5$ | Ratio tan/sec. |
|---|---|---|---|---|---|---|---|---|---|---|
| 1 | 74.3 | 25.7 | | | 10 | 3.0 | 5500 | 1.25 | 0.163 | 7.67 |
| 2 | 81.4 | | 18.6 | | 10 | 3.0 | 7500 | 1.40 | 0.50 | 2.80 |
| 3 | 70 | | | 30 | 10 | >40.0 | 7500 | 1.54 | 0.85 | 1.81 |

Runs 4, 5 and 6 illustrate the invention and show the effect of the addition of component (d). Two-part compositions were prepared wherein part one was the base resin (a) and the crosslinker (b) and the second part was the component (d) and the catalyst and, a small amount of component (a) as a carrier. The ratio of part one to part two was 10:1. The results are shown in Table II below.

TABLE II

| Run No. | Total Parts A | Total Parts B | Total Parts C | Total Parts D | Parts Component (d) | cat ppm | Visc. Pa·s @25° C. of part one | Cured flex strength psi | Cured tan modulus psi × 10$^5$ | Cured sec. modulus psi × 10$^5$ | Ratio tan/sec. |
|---|---|---|---|---|---|---|---|---|---|---|---|
| 4 | 78.3 | 29.2 | | | 2.5 | 10 | 5.0 | 3255 | 0.933 | 0.128 | 7.29 |
| 5 | 86.2 | | 21.3 | | 2.5 | 10 | 2.0 | 6133 | 1.27 | 0.428 | 2.97 |
| 6 | 74 | | | 33.5 | 2.5 | 10 | 5.0 | 7543 | 1.72 | 1.01 | 1.69 |

EXAMPLE 2

This example serves to illustrate the comparison between the prior art diluent (φViMeSi)$_2$O and the inventive diluent. FIG. 1 illustrates the loss in flex strength of the resin as the amount of the prior art diluent is increased. The increase in diluent is to decrease the viscosity so that the base resin can be easily handled.

Runs 7, 8 and 9 on Table III show the use of ($\phi$ViMeSi)$_2$O as the reactive diluent wherein $\phi$ is C$_6$H$_5$—, Vi is CH$_2$=CH— and Me is CH$_3$—. Two part compositions were again prepared wherein part one was the base resin (a) and the crosslinker (b) and the second part was ($\phi$ViMeSi)$_2$O, the catalyst and a small amount of component (a) as a carrier. The ratio of part one to part two was 10:1. The catalyst was the same as used in Example 1.

TABLE III

| Run No. | Total Parts A | Total Parts B | Total Parts ($\phi$ViMeSi)$_2$O | cat ppm | Pa.s Visc. of Part One @25° C. | Pa.s Visc. of all Components @25° C. | Cured Flex strength psi | Cured tan modulus psi × 10$^5$ | Cured sec. modulus psi × 10$^5$ | Ratio tan/sec. |
|---|---|---|---|---|---|---|---|---|---|---|
| 7 | 79.2 | 29.2 | 1.67 | 10 | 3.3 | 17.8* | 3434 | .796 | .128 | 6.2 |
| 8 | 76.6 | 30.2 | 3.33 | 10 | 2.1 | .48 | 1667 | .259 | .129 | 2.00 |
| 9 | 74.0 | 31.0 | 5.00 | 10 | water thin | water thin | 549 | .042 | — | — |

*unacceptable for handling

That which is claimed is:
1. An improved curable composition consisting essentially of a mixture of
   (a) an organopolysiloxane containing from 67 to 85 mol percent C$_6$H$_5$SiO$_{3/2}$ units and 33 to 15 mol percent of CH$_2$=CH(CH$_3$)$_2$SiO$_{\frac{1}{2}}$ units, said organopolysiloxane having an average of at least 8 silicon atoms per molecule;
   (b) a silicon hydride containing polysiloxane crosslinker for (a), said (b) being present in an amount sufficient to provide about 0.9 to 1.1 mol of silicon hydride per mol of CH$_2$=CHSi present in (a) and (d);
   (c) a platinum catalyst in an amount sufficient to catalyze the reaction of the silicon hydride with the CH$_2$=CHSi—; the improvement comprising adding a reactive diluent
   (d) having the formula {CH$_2$=CH(CH$_3$)$_2$SiO}$_2$Si(C$_6$H$_5$)$_2$ in a ratio of 1:4 to 1:1 of component (d) to component (a).

2. A curable composition as claimed in claim 1 wherein (c), the platinum catalyst, is present in an amount sufficient to provide at least 0.1 parts by weight platinum per million parts of the combined weight of (a), (b) and (d).

3. A curable composition as claimed in claim 1 wherein (b) is present in an amount sufficient to provide about 1.0 mol of silicon hydride per mol of CH$_2$=CHSi— in (a) and (d).

4. A curable composition as claimed in claim 1 wherein the amount of (d) present is 25 parts and there is present 75 parts of (a).

5. A composition as claimed in claim 1 when cured.

6. A composition as claimed in claim 2 wherein the platinum catalyst (c) is {R$_3$PPtCl$_2$}$_2$ and R is selected from a group consisting of the methyl, ethyl, propyl and butyl radicals.

7. A composition as claim in claim 6 wherein the platinum catalyst (c) is ((C$_4$H$_9$)$_3$PPtCl$_2$)$_2$.

* * * * *

UNITED STATES PATENT AND TRADEMARK OFFICE
CERTIFICATE OF CORRECTION

PATENT NO. : 4,234,713
DATED : November 18, 1980
INVENTOR(S) : Gary E. LeGrow

It is certified that error appears in the above-identified patent and that said Letters Patent are hereby corrected as shown below:

In the ABSTRACT, line 3; the formula $\{CH_2=CH(CH_3)_2SiO\}_2Si(C_6H_5)_2$ should read $\{CH_2=CH(CH_3)_2SiO\}_2Si(C_6H_5)_2$ In Column 2, line 59; the line "of 1 mol of silicon hydride to 1 of alkenyl for the best" should read "of 1 mol of silicon hydride to 1 mol of alkenyl for the best".

In Column 6, line 39; the line "A composition as claim in claim 6 wherein the" should read "A composition as claimed in claim 6 wherein the".

Signed and Sealed this

First Day of September 1981

[SEAL]

Attest:

GERALD J. MOSSINGHOFF

Attesting Officer    Commissioner of Patents and Trademarks